(12) United States Patent
Hosaka et al.

(10) Patent No.: US 8,900,734 B2
(45) Date of Patent: Dec. 2, 2014

(54) BIPOLAR SECONDARY BATTERY

(75) Inventors: Kenji Hosaka, Yokohama (JP);
Hirotatsu Kamimura, Yokohama (JP);
Shiho Inoue, Yokohama (JP); Yasutaka Nakamura, Yokohama (JP); Eiji Minegishi, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 42 days.

(21) Appl. No.: 13/698,394

(22) PCT Filed: May 17, 2011

(86) PCT No.: PCT/JP2011/061301
§ 371 (c)(1),
(2), (4) Date: Nov. 16, 2012

(87) PCT Pub. No.: WO2011/145609
PCT Pub. Date: Nov. 24, 2011

(65) Prior Publication Data
US 2013/0065097 A1 Mar. 14, 2013

(30) Foreign Application Priority Data

May 19, 2010 (JP) ................. 2010-115123

(51) Int. Cl.
*H01M 2/34* (2006.01)
*H01M 10/50* (2006.01)
*H01M 10/637* (2014.01)
*H01M 2/02* (2006.01)
*H01M 2/26* (2006.01)
*H01M 10/04* (2006.01)
*H01M 10/0585* (2010.01)

(52) U.S. Cl.
CPC ................ *H01M 2/34* (2013.01); *H01M 2/348* (2013.01); *H01M 10/5026* (2013.01); *H01M 2/0207* (2013.01); *H01M 2/266* (2013.01); *H01M 10/0418* (2013.01); *H01M 10/0585* (2013.01); *Y02E 60/12* (2013.01)
USPC ............................................... 429/62; 429/61

(58) Field of Classification Search
CPC ................. H01M 2200/106; H01M 10/50216; H01M 2/348
USPC ...................................................... 429/61, 62
See application file for complete search history.

(56) References Cited

U.S. PATENT DOCUMENTS

| | | | |
|---|---|---|---|
| 6,577,105 B1 * | 6/2003 | Iwaizono | 320/134 |
| 2007/0120526 A1 | 5/2007 | Kumeuchi et al. | |
| 2010/0084161 A1 * | 4/2010 | Neal et al. | 174/126.1 |

FOREIGN PATENT DOCUMENTS

| | | |
|---|---|---|
| CN | 1304559 A | 7/2001 |
| JP | 7-220755 A | 8/1995 |

(Continued)

OTHER PUBLICATIONS

Chinese Office Action dated Jun. 27, 2014, 7 pgs.

*Primary Examiner* — Ula C. Ruddock
*Assistant Examiner* — Scott J Chmielecki
(74) *Attorney, Agent, or Firm* — Foley & Lardner LLP

(57) ABSTRACT

A bipolar secondary battery comprises laminated bodies. The laminated body comprises bipolar electrodes laminated via an electrolyte layer. The bipolar electrode comprises a positive electrode active material layer and a negative electrode active material layer formed on surfaces of a current collector. A positive electrode is formed on one end of the laminated bodies and a negative electrode is formed on another end. A temperature sensitive resistor having a smaller area than an electrical reaction area of the positive electrode active material layer and the negative electrode active material layer is arranged between the positive electrode and the negative electrode of a pair of adjacent laminated bodies, thereby suppressing a temperature increase caused by a high current by increasing the resistance in response to the flow of the high current into the bipolar secondary battery such as when an external circuit is shorted.

11 Claims, 7 Drawing Sheets

(56) References Cited

FOREIGN PATENT DOCUMENTS

| | | |
|---|---|---|
| JP | 2004-178914 A | 6/2004 |
| JP | 2007-173223 A | 7/2007 |
| JP | 2007-299680 A | 11/2007 |
| JP | 2009-252548 A | 10/2009 |
| JP | 2011-48392 A | 3/2011 |

* cited by examiner

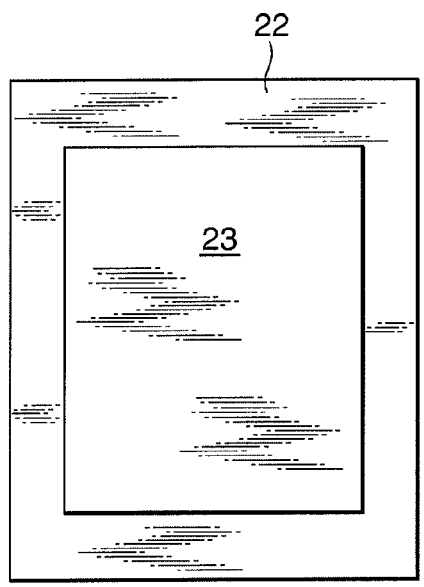 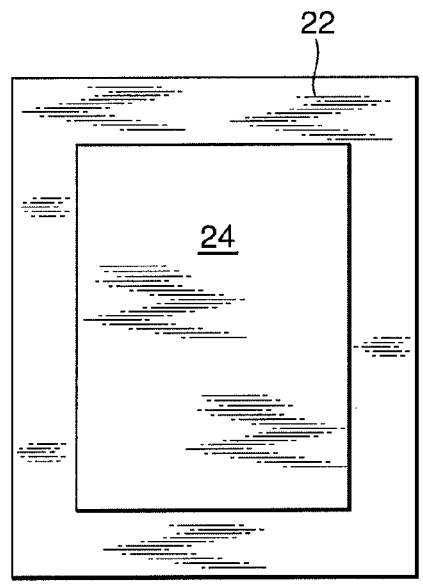
FIG. 10A      FIG. 10B
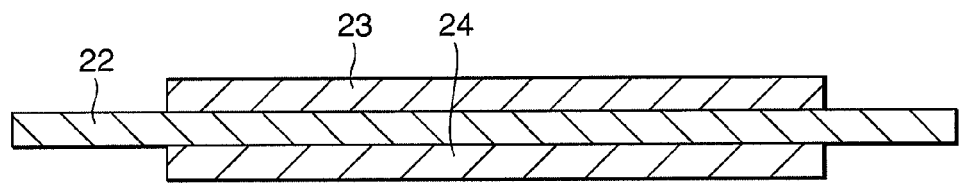
FIG. 10C

BIPOLAR SECONDARY BATTERY

FIELD OF THE INVENTION

This invention relates to suppression of a temperature increase of a bipolar secondary battery.

BACKGROUND OF THE INVENTION

A bipolar secondary battery such as a lithium-ion battery used in an electrically-driven vehicle such as a hybrid electric vehicle (HEV) or an electric vehicle (EV) comprises a laminated body of cells. Each cell comprises an electrolyte layer, a positive electrode active material layer in contact with one surface of the electrolyte layer and a negative electrode active material layer in contact with another surface of the electrolyte layer.

A plate-like current collector having a larger area is laminated on an outer side of each of the positive electrode active material layer and the negative electrode active material layer. A fluid sealant is filled between the current collectors corresponding to the outer periphery of the electrolyte layer to prevent the electrolyte layer from being degraded due to moisture in the air. The electrolyte layer, the positive electrode active material layer and the negative electrode active material layer are thereby blocked from outside air.

A fluid sealant such as paraffin undergoes electrolysis under a high voltage. The electrolyzed fluid sealant can no longer keep a necessary insulation property.

JP2009-252548A published by the Japan Patent Office in 2009 proposes to divide the fluid sealant into a plurality of sealed layers such that a fluid sealant does not undergo a high voltage.

SUMMARY OF THE INVENTION

When an external circuit connected to a bipolar secondary battery is shorted, a large amount of a short-circuit current flows continuously in the battery and the battery produces heat.

Although the bipolar secondary battery according to the prior art technology may be useful in preventing a high voltage from being exerted on the fluid sealant in such a situation, but does not function to interrupt a short-circuit current or prevent heat generation of the battery itself.

It is therefore an object of this invention to protect a bipolar secondary battery from a temperature increase caused by a large current.

In order to achieve the above object, a bipolar secondary battery according to this invention comprises a plurality of laminated bodies connected in series. Each laminated body comprises a plurality of bipolar electrodes laminated via an electrolyte layer. Each bipolar electrode comprises a plate-like current collector, a positive electrode active material layer arranged on one surface of the current collector and a negative electrode active material layer arranged on another surface of the current collector. The laminated body further comprises a positive electrode formed on one end in a lamination direction of the bipolar electrodes and a negative electrode formed on another end.

The bipolar secondary battery further comprises a temperature sensitive resistor arranged between the positive electrode and the negative electrode of a pair of adjacent laminated bodies. The temperature sensitive resistor increases resistance in response to a temperature increase and has an aria smaller than an electrical reaction area of the positive electrode active material layer and the negative electrode active material layer.

The details as well as other features and advantages of this invention are set forth in the remainder of the specification and are shown in the accompanying drawings.

BRIEF DESCRIPTION OF THE DRAWINGS

FIGS. 10A to 10C are a front view, a rear view and a longitudinal sectional view of a bipolar electrode.

DESCRIPTION OF THE PREFERRED EMBODIMENTS

Figure 1:
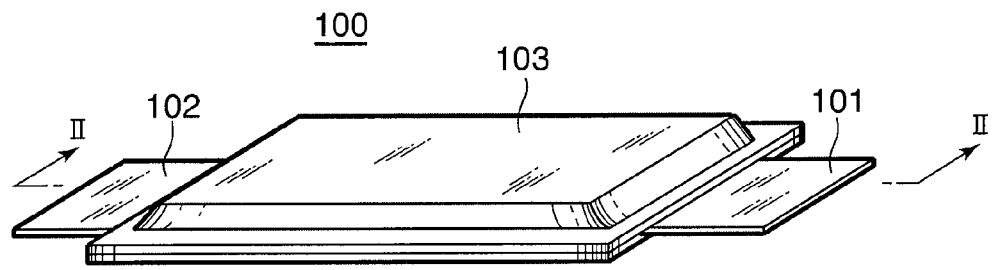
FIG. 1 is a perspective view of a bipolar secondary battery according to this invention.

Referring to FIG. 1 of the drawings, a bipolar secondary battery 100 comprises a case 103 having a substantially rectangular horizontal section and a positive electrode current collecting plate 101 and a negative electrode current collecting plate 102 taken out from the inside of the case 103 through two opposite sides of the case 103.

Figure 2:
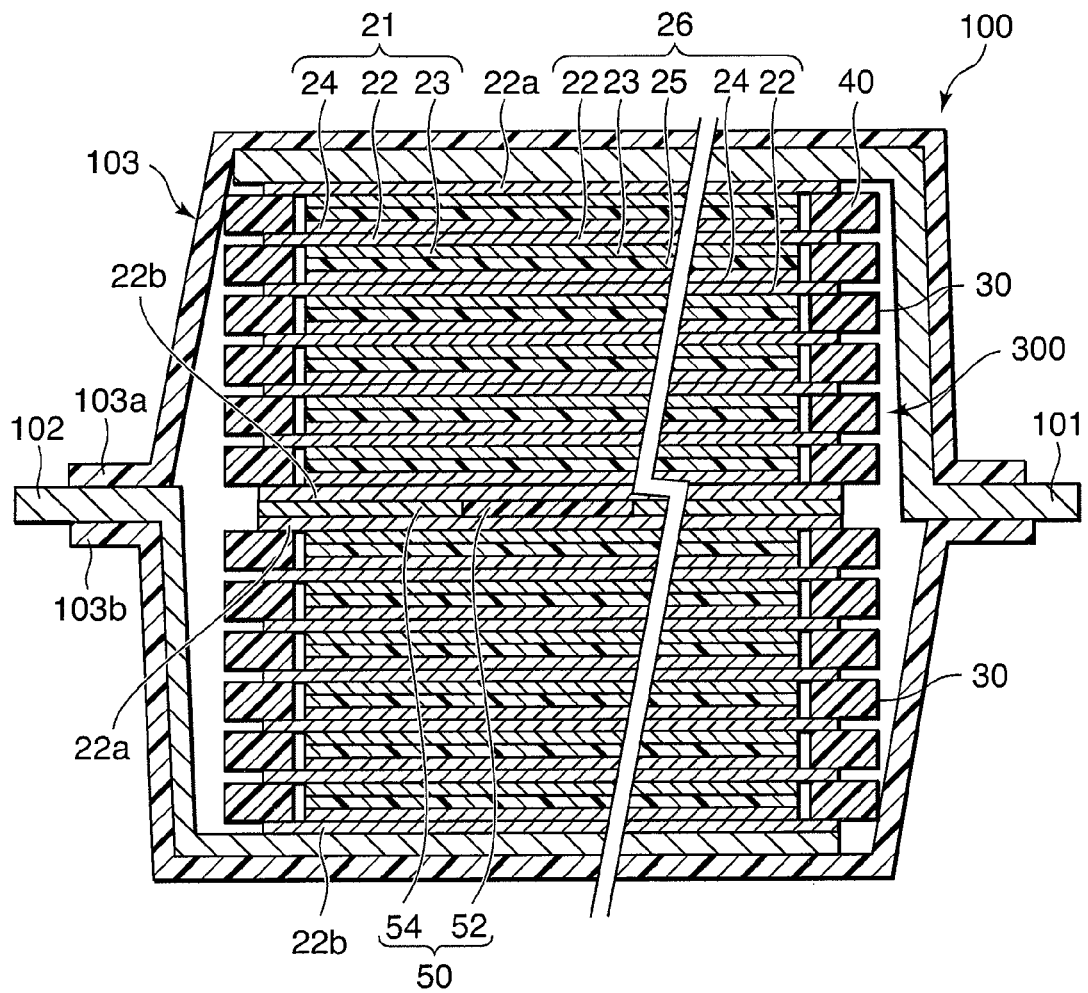
FIG. 2 is a longitudinal sectional view of the bipolar secondary battery taken along a line II-II of FIG. 1.

Referring to FIG. 2, the bipolar secondary battery 100 comprises a battery main body 300 inside the case 103. The battery main body 300 is formed by connecting two laminated bodies 30, in each of which a plurality of cells 26 is laminated, in series. The cells 26 are formed of a lithium ion cell, for example. The positive electrode current collecting plate 101 and the negative electrode current collecting plate 102 are fixed to the inner peripheral surface of the case 103 while gripping the battery main body 300.

The case 103 functions to block the battery main body 300 from outside air and protect the battery main body 300. The case 103 is composed of a pair of case members 103a and 103b. Each of the case members 103a, 103b comprises a recessed portion for housing the battery main body 300 and a flange portion surrounding the recessed portion.

The case 103 is integrally formed by welding the flange portions of the pair of case members 103a and 103b while gripping the positive electrode current collecting plate 101 and the negative electrode current collecting plate 102 extending from the inside to the outside of the case 103. The case 103 is made of a sheet-like material having such strength as not to damage the laminated bodies 30 against a pressure difference produced between the inside and the outside of the case 103 and deformable flexibility. Preferably, the sheet-like material does not allow electrolytic solutions and gases to permeate, has an electrical insulation property and is chemically stable against materials such as electrolytic solutions.

Preferably, a laminated film, polyethylene, polypropylene, polycarbonate and the like are used as the sheet-like material. The laminated film is such that a metal foil of a metal including an alloy of aluminum, stainless steel, nickel, copper or the like is covered with an insulating synthetic resin film such as a polypropylene film.

The cell 26 constituting the laminated body 30 is composed of an electrolyte layer 25, a positive electrode active material layer 23 and a negative electrode active material layer 24 laminated on opposite sides of the electrolyte layer 25, and plate-like current collectors 22 laminated on the outer sides of the positive electrode active material layer 23 and the negative electrode active material layer 24 with respect to a lamination direction and having a larger area. However, in the case of laminating the plurality of cells 26 as shown, only one current collector 22 is provided between the adjacent cells 26.

A known material is used for the current collector 22. For example, aluminum or stainless steel (SUS) can be used. A polymer material may also be used for the current collector 22. Specifically, polyolefin (polypropylene, polyethylene), polyester (PET, PEN), polyimide, polyamide and polyvinylidene fluoride (PVdF) can be used. To provide these polymer materials with electrical conductivity, particles of carbon such as Ketjen Black, acetylene black or carbon black or of a metal such as aluminum (Al), copper (Cu), stainless steel (SUS) or titanium (Ti) are preferably dispersed in the polymer material.

The positive electrode active material layer 23 comprises a positive electrode active material and can further comprise a conductive assistant, a binder and the like. A complex oxide of a transition metal and lithium used in a solution lithium-ion battery can be used as the positive electrode active material.

The negative electrode active material layer 24 comprises a negative electrode active material and can further comprise a conductive assistant, a binder and the like. A negative electrode active material used in a solution lithium-ion battery can be used as the negative electrode active material.

Particularly, it is possible to form a battery with excellent capacity and output characteristic by using a lithium-transition metal complex oxide as the positive electrode active material of the positive electrode active material layer 23 and using a carbon or lithium-transition metal complex oxide as the negative electrode active material of the negative electrode active material layer 24.

The electrolyte layer 25 is a layer or a liquid electrolyte including an ion-conducting polymer. In this embodiment, a polymer gel electrolyte obtained by impregnating a separator as a base material with a pre-gel solution and then applying chemical crosslinking or physical crosslinking is used as the electrolyte. An electrolytic solution included in the electrolyte layer 25 contains an organic solvent such as polyprene carbonate, ethylene carbonate or diethyl carbonate, and boils and gasifies with an increase in temperature. The melting point of the separator is 134 degrees Celsius (° C.) when a polyethylene (PE) film is used as the separator. The boiling point of the electrolytic solution is 140° C.

Although described in detail later, the electrolytic solution is applied to surfaces of the positive electrode active material layer 23 and the negative electrode active material layer 24 and impregnated into the separator by placing the positive electrode active material layer 23 and the negative electrode active material layer 24 on the separator. It should be noted that a detailed structure is not shown in FIG. 2 so as to show the configuration of the battery main body 300 in an easily understandable manner. Specifically, the separator is not shown.

The outer periphery of the cell 26 is covered by a seal portion 40. The seal portion 40 is filled between outer peripheral parts of the adjacent current collectors 22 and blocks the contact of the positive electrode active material layer 23, the electrolyte layer 25 and the negative electrode active material 24 with outside air. The seal portion 40 prevents a reduction in the ion-conductivity of the electrolyte by sealing the cell 26. Further, a liquid junction by liquid leakage is prevented in the case of using a liquid or semisolid gel electrolyte.

A rubber-based resin which adheres to the current collector 22 by being pressed and deformed or a thermally fusible resin which adheres to the current collector 22 by being thermally fused through heating and pressing can be, for example, used as a seal precursor.

The rubber-based resin is not particularly limited, but preferably selected from a group including silicon-based rubber, fluorine-based rubber, olefin-based rubber and nitrile-based rubber. These rubber-based resins are excellent in sealing ability, alkali resistance, chemical resistance, durability, weather resistance, heat resistant, etc. and these excellent properties and qualities can be maintained for a long period of time also in the use environments of secondary batteries.

The thermally fusible resin preferably exhibits an excellent sealing effect in every use environment of the laminated body 30. The thermally fusible resin is, for example, selected from a group including silicon, epoxy, urethane, polybutadiene, olefin-based resin (polypropylene, polyethylene, etc.) and paraffin wax. These thermally fusible resins are excellent in sealing ability, alkali resistance, chemical resistance, durability, weather resistance, heat resistance, etc. and excellent properties and qualities can be maintained for a long period of time in the use environments of secondary batteries.

In a production process of the laminated body 30, a plurality of bipolar electrodes 21 in each of which the positive electrode active material layer 23 is formed on one surface of the current collector 22 and the negative electrode active material layer 24 is formed on the other surface and a plurality of electrolyte layers 25 are alternatively laminated over six layers.

A current collector 22a and a current collector 22b are laminated on both ends of the laminated body 30 with respect to the lamination direction. Different from the current collector 22, the positive electrode active material layer 23 is formed on one surface of the current collector 22a, but nothing is formed on the other surface. The negative electrode active material layer 24 is formed on one surface of the current collector 22b, but nothing is formed on the other surface. The current collector 22a is laminated with the positive electrode active material layer 23 held in contact with the electrolyte layer 25. The current collector 22b is laminated with the negative electrode active material layer 24 held in contact with the electrolyte layer 25. The current collector 22a forms a positive electrode of the laminated body 30 and the current collector 22b forms a negative electrode of the laminated body 30.

Six cells 26 laminated as described above are thermally pressed using a thermal press machine so that the seal portions 40 have a predetermined thickness, and the uncured seal portions 40 are further cured, whereby the bipolar laminated body 30 is completed.

Figure 3:
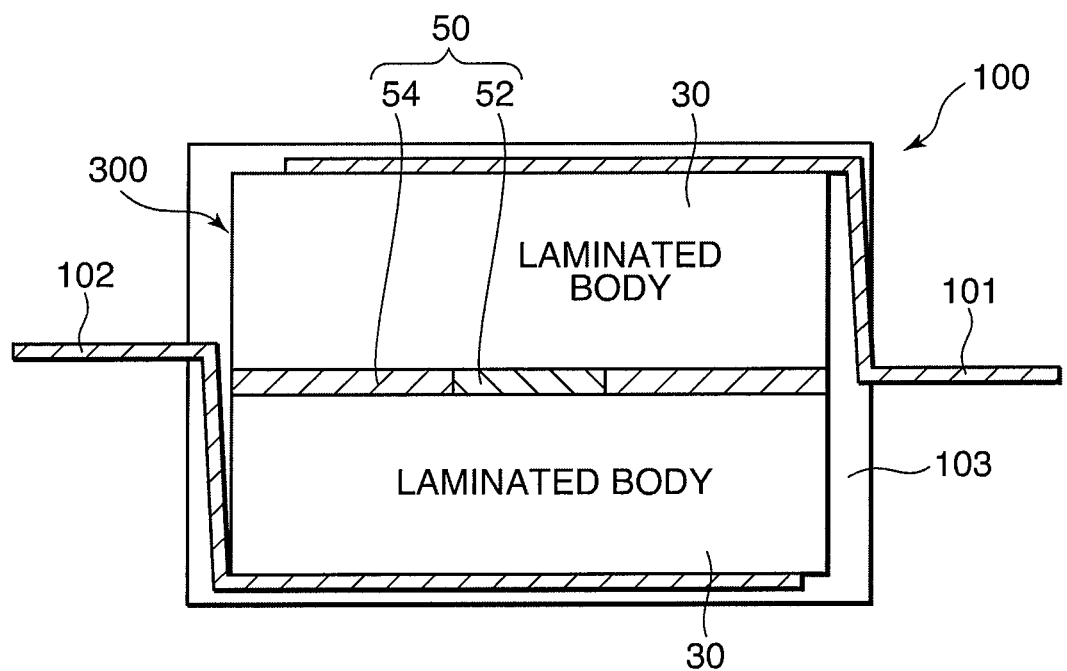
FIG. 3 is a schematic longitudinal sectional view of the bipolar secondary battery.

Referring to FIG. 3, the battery main body 300 comprises two laminated bodies 30 arranged in series such that a current control layer 50 is arranged between the current collector 22a of one laminated body 30 and the current collector 22b of the other laminated body 30. It should be noted that essential parts are drawn in a deformed manner in FIG. 3 to clearly show characteristics.

Figure 4:
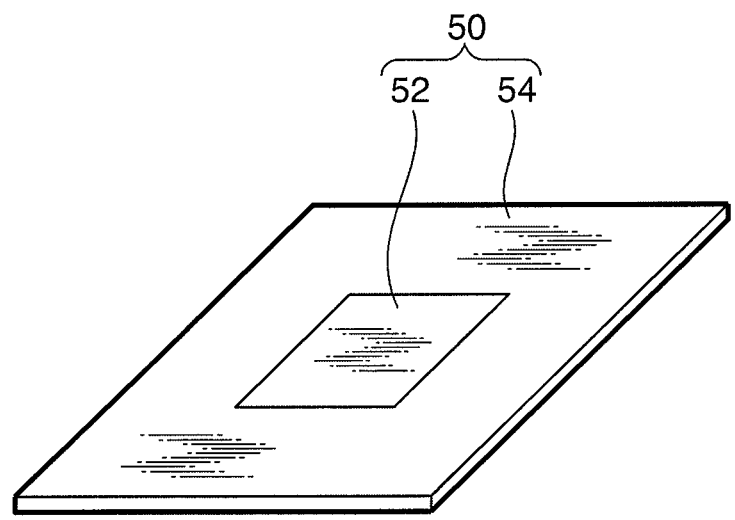
FIG. 4 is a perspective view of a current control layer according to this invention.

Referring to FIG. 4, the current control layer 50 comprises a temperature sensitive resistor 52 whose electrical resistance increases in response to a temperature increase and a current interrupting portion 54 having an electrical resistance value higher than the resistance of the temperature sensitive resistor 52 when temperature increases.

The current interrupting portion 54 is formed of a plate member that has an outer shape equivalent to those of the adjacent current collectors 22a and 22b and a high electrical resistance. A rectangular cut is made in a central part of the current interrupting portion 54 and the temperature sensitive resistor 52 is fitted into the cut part.

The temperature sensitive resistor 52 has a property of increasing the electrical resistance in response to a temperature increase. The current interrupting portion 54 has a higher electrical resistance than the temperature sensitive resistor 52 when temperature increases.

The area of the temperature sensitive resistor 52 to be fitted into the central part of the current interrupting portion 54 is set to be smaller than surfaces facing the positive electrode active material layer 23 and the negative electrode active material layer 24, i.e. an electrical reaction area. Thus, current density of the temperature sensitive resistor 52 when the bipolar secondary battery 100 is charged and discharged is higher than current density in the laminated bodies 30. In terms of the electrical resistance increasing property caused by a temperature increase, the area of the temperature sensitive resistor 52 is preferably between $1/2$ and $1/500$ of the electrical reaction area of the positive electrode active material layer 23 and the negative electrode active material layer 24.

The temperature sensitive resistor 52 and the current interrupting portion 54 electrically connect the adjacent current collector 22a of one laminated body 30 and the current collector 22b of the other laminated body 30 in parallel.

The current interrupting portion 54 is made of a resin material which allows almost no current flow, e.g. polyolefin such as polypropylene (PP) or polyethylene (PE), polyester (PET) or the like.

The temperature sensitive resistor 52 is formed of a positive temperature coefficient (PTC) thermistor whose electrical resistance increases in response to a temperature increase. The temperature sensitive resistor 52 has a higher glass transition point than other constituent elements of the battery main body 300 and starts increasing the electrical resistance at a temperature lower than the melting points of the other constituent elements or the boiling point of the electrolytic solution. By this property, the temperature sensitive resistor 52 can suppress a current flowing in the battery main body 300 by increasing the electrical resistance before the constituent elements of the battery main body 300 are damaged due to a temperature increase.

Polymer PTC, inorganic oxide PTC or the like can be used as the material of the PTC thermistor. Alternatively, a material obtained by dispersing a conductive substance in polymer such as polypropylene (PP) or polyethylene (PE), a conductive porous or meshed member or a material obtained by coating a meshed member made of PP polymer or PE polymer with nickel (Ni) metal can be used as the material of the PTC thermistor.

If the electrical resistance of the temperature sensitive resistor 52 in a normal temperature condition during the normal use of the bipolar secondary battery 100 is set to be $1/100$ or less of the internal resistance of the laminated bodies 30, the current control layer 50 does not affect charge/discharge performance of the bipolar secondary battery 100.

A temperature at which the electrical resistance starts increasing differs depending on the type of the PTC. By deciding which PCT to use, the temperature at which the electrical resistance starts increasing can be arbitrarily set.

Preferably, the temperature at which the electrical resistance of the temperature sensitive resistor 52 starts increasing is set to be the lower one of the boiling point of the electrolytic solution and the melting point of the separator. That is, this temperature is set at 134° C. or lower. By this setting, currents flowing in the laminated bodies 30 can be suppressed before the electrolytic solution boils and the separator melts.

More preferably, if the temperature at which the electrical resistance of the temperature sensitive resistor 52 starts increasing is set at a temperature lower than the lower one of the boiling point of the electrolytic solution and the melting point of the separator by 20° C., the overshoot of a temperature increase can be prevented even in a condition where the temperature increase is accelerated by an excessive current.

As the temperature sensitive resistor 52, it is also preferable to use a PTC element having such a reversible property with respect to temperature that resistance increases with increasing temperature and decreases with decreasing temperature. The temperature sensitive resistor 52 formed of such a PTC element suppresses a current by increasing a resistance value when an excessive current flows while allowing a current to flow again by decreasing the resistance value when temperature decreases due to the suppressed current. That is, by repeatedly suppressing a current and lifting the suppression, in other words, by inducing a hunching phenomenon, battery energy can be gradually released.

However, the use of the PTC element having the reversible property is not an essential requirement of this invention. Even if a PTC element having an irreversible property is used as the temperature sensitive resistor 52, currents flowing in the laminated bodies 30 can be suppressed before the electrolytic solution boils and the separator melts.

The bipolar secondary battery 100 is completed by laminating the positive electrode current collecting plate 101 and the negative electrode current collecting plate 102 on the opposite end surfaces of the battery main body 300 with respect to the lamination direction of the cells 26 and housing and vacuum-sealing them into the case 103 as described above.

In the bipolar secondary battery 100 used in an electrically-driven vehicle such as a hybrid electric vehicle (HEV) or an electric vehicle (EV), various electrical circuits that operate on power supplied from the bipolar secondary battery 100 may experience trouble, for example, when a strong impact is applied to a vehicle body. If a current is supplied from the bipolar secondary battery 100 to the faulty electrical circuit, an excessive current continues to flow into the faulty electrical circuit to heat the circuit, whereby a high-current line may be shorted. Further, high-current lines in the bipolar secondary battery 100 may be possibly shorted.

This bipolar secondary battery 100 comprises the temperature sensitive resistor 52 having an area smaller than the electrical reaction area of the positive electrode active material layer 23 and the negative electrode active material layer 24 between the laminated bodies 30. Inevitably, the density of a current flowing in the temperature sensitive resistor 52 becomes higher than that in the laminated bodies 30. Accordingly, if an excessive current flows in the bipolar secondary battery 100, the self-heat generation of the temperature sensitive resistor 52 first occurs. Subsequent temperature increases of the laminated bodies 30 promote a temperature increase of the temperature sensitive resistor 52 arranged between the laminated bodies 30.

The temperature sensitive resistor 52 increases the resistance value with increasing temperature. Accordingly, the flow of a short-circuit current is suppressed by the temperature sensitive resistor 52 whose resistance value has increased before the temperatures of the laminated bodies 30 reach an upper limit temperature at which battery functions stop. As a result, an excessive current is suppressed at an early stage and a temperature increase of the battery main body 300 due to the excessive current can be prevented.

For high responsiveness to an excessive current, the temperature sensitive resistor 52 desirably has a small area and is made of a material that quickly increases resistance in response to a temperature increase. On the other hand, the electrical resistance of the temperature sensitive resistor 52 in normal time should be low not to affect normal charge/discharge performance of the bipolar secondary battery 100. To meet these requirements, the area of the temperature sensitive resistor 52 is preferably set in the range of ½ to 1/100 of the electrical reaction area of the positive electrode active material layer 23 and the negative electrode active material layer 24.

As shown in FIGS. 5 to 8, the arrangement of the current control layer 50 and the position of the temperature sensitive resistor 52 in the current control layer 50 are not necessarily limited to those in this example. It should be noted that essential parts are drawn in a deformed manner in FIGS. 5, 6 and 8 to clearly show characteristics as in FIG. 3.

Figure 5:
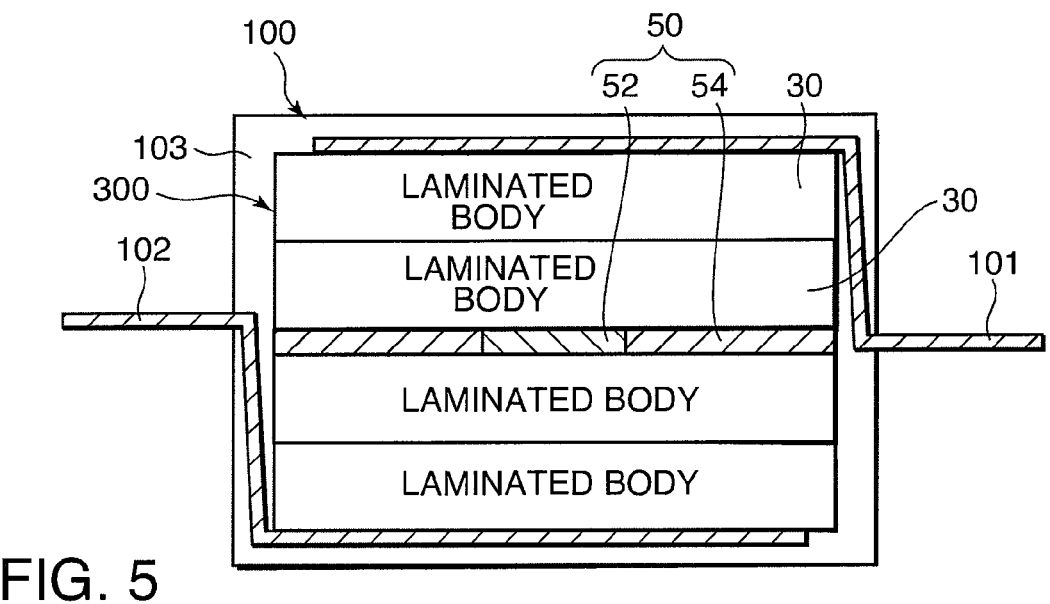
FIG. 5 is a schematic longitudinal sectional view of a bipolar secondary battery showing a variation on the arrangement of the current control layer.

Referring to FIG. 5, in the case of forming the battery main body 300 by four laminated bodies 30, the current control layer 50 is preferably arranged between the second and third laminated bodies 30 from one end of the battery main body 300, i.e. in a middle part of the battery main body 300 with respect to the lamination direction of the laminated bodies 30.

Figure 6:
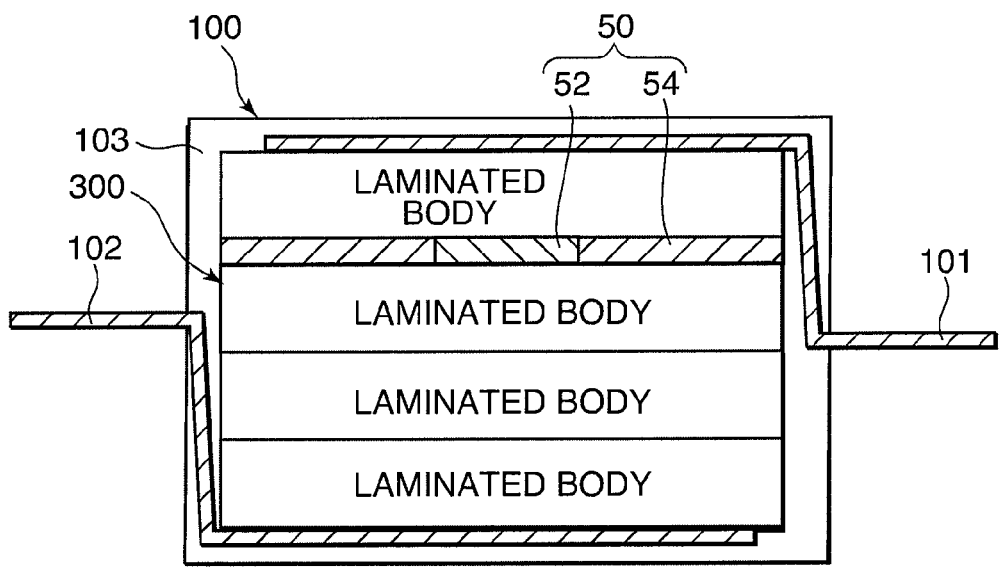
FIG. 6 is a schematic longitudinal sectional view of a bipolar secondary battery showing another variation on the arrangement of the current control layer.

Referring to FIG. 6, in the case of forming the battery main body 300 by four laminated bodies 30, the current control layer 50 can also be arranged between the first and second laminated bodies 30 from one end of the battery main body 300. In this case, the temperature sensitive resistor 52 is arranged at a position deviated from the center of the battery main body 300 with respect to the lamination direction of the cells 26 as compared with the bipolar secondary battery 100 of FIG. 5. In such a case, a temperature rise promoting effect of the temperature sensitive resistor 52 by temperature increases of the laminated bodies 30 cannot be obtained as much as in the bipolar secondary battery 100 of FIG. 5, but such an arrangement is possible depending on the interior layout of the battery main body 300.

Figure 7:
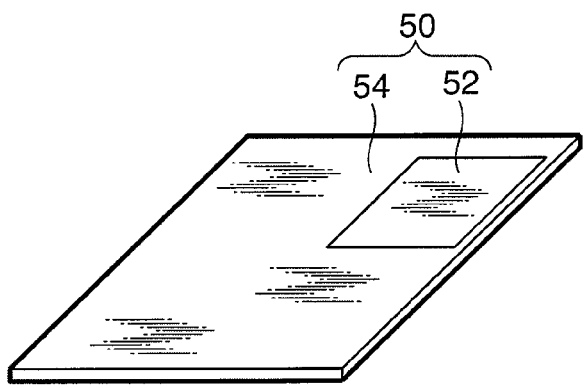
FIG. 7 is a perspective view of a current control layer showing a variation on the arrangement of a temperature sensitive resistor according to this invention.
Figure 8:
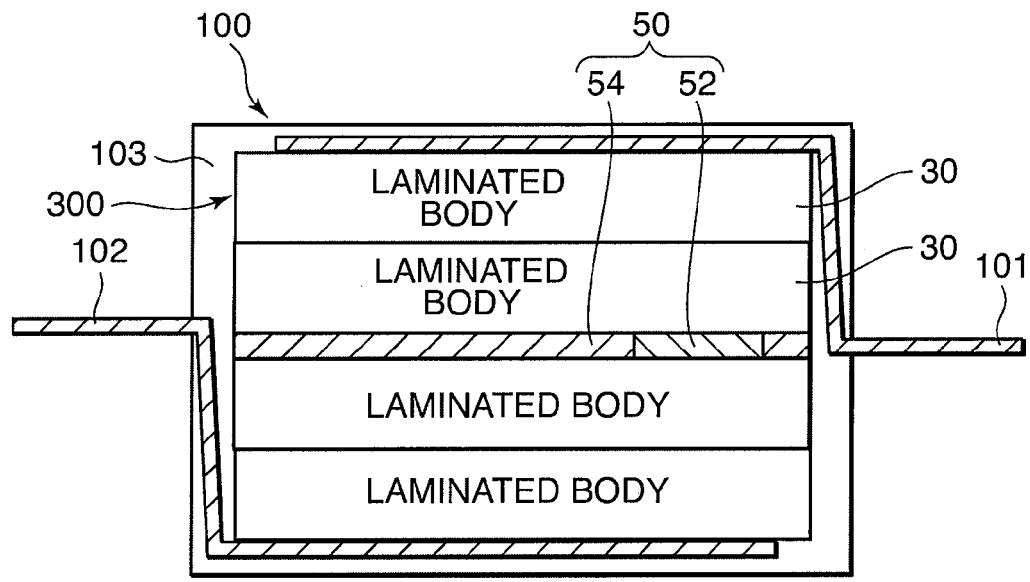
FIG. 8 is a schematic longitudinal sectional view of a bipolar secondary battery using the current control layer of FIG. 7.

Referring to FIGS. 7 and 8, it is also possible to dispose the temperature sensitive resistor 52 not in the central part of the current control layer 50, but in a corner part of the current control layer 50. If the temperature sensitive resistor 52 is disposed in the corner part of the current control layer 50, the temperature rise promoting effect of the temperature sensitive resistor 52 by temperature increases of the laminated bodies 30 is limited as compared with the case where the temperature sensitive resistor 52 is disposed in the central part of the current control layer 50, but such an arrangement of the temperature sensitive resistor 52 is also possible when there is a certain restriction in the current control layer 50.

As described above, according to this bipolar secondary battery 100, the temperature sensitive resistor 52 increases the electrical resistance in response to a temperature increase of the bipolar secondary battery 100 when an excessive current such as a short-circuit current flows in the bipolar secondary battery 100. This can suppress a temperature increase of the battery main body 300 by interrupting or suppressing a current.

Particularly, the boiling of the electrolytic solution and the melting of the separator can be prevented by setting the temperature, at which the electrical resistance of the temperature sensitive resistor 52 starts increasing, to be not higher than the lower one of the boiling point of the electrolytic solution and the melting point of the separator.

Figure 9:
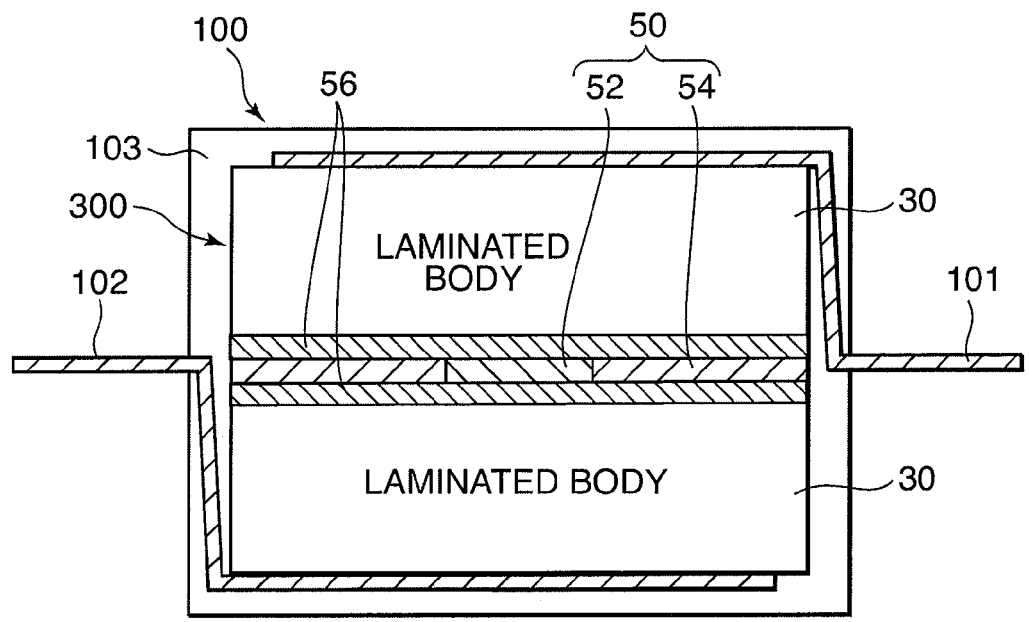
FIG. 9 is a schematic longitudinal sectional view of a bipolar secondary battery according to a second embodiment of this invention.

Referring to FIG. 9, a second embodiment of this invention will be described. Essential parts are drawn in a deformed manner also in FIG. 9 to clearly show characteristics.

In this embodiment, a current moderation layer 56 having a lower resistance than a bipolar electrode 21 is arranged between a current control layer 50 and each of current collectors 22a and 22b.

The current moderation layer 56 is formed of a metal foil or a metal plate of aluminum (Al), copper (Cu) or the like. The other configuration of the bipolar secondary battery 100 is the same as in the first embodiment.

Since the electrical resistance of the current moderation layer 56 is lower than that of the bipolar electrode 21 in this embodiment, a current from the bipolar electrode 21 can be concentrated on a temperature sensitive resistor 52 through the current moderation layer 56 even if the resistance of the bipolar electrode 21 is high. Specifically, since the current moderation layer 56 promotes the concentration of a current on the temperature sensitive resistor 52, the self-heat generation of the temperature sensitive resistor 52 can be promoted. An effect of promoting the concentration of a current by the current moderation layer 56 becomes more obvious as the resistance of the bipolar electrode 21 increases.

Although it is desirable to provide the current moderation layers 56 on opposite sides of the current control layer 50, the concentration of a current from one laminated body 30 can be promoted even if the current moderation layer 56 is provided only on one side of the current control layer 50.

Next, referring to FIGS. 10A to 10C, FIGS. 11A and 11B, FIGS. 12A and 12B, FIG. 13 and FIG. 14, an experiment conducted by the inventors on the manufacturing of the bipolar secondary battery 100 and a current suppression capability of the obtained product will be described.

First, a fabrication process of the bipolar electrode 21 will be described.

The positive electrode active material layer 23 was prepared in the following manner. Specifically, a mixture of 85 weight percent (wt %) of $LiMn_2O_4$ as a positive electrode active material, 5 weight percent (wt %) of acetylene black as a conductive assistant and 10 wt % of polyvinylidene fluoride (PVdF) as a binder is prepared. N-methylpyrrolidone (NMP) as a slurry viscosity adjusting solvent was added to the mixture until a viscosity optimal for an application operation was reached, whereby a positive electrode slurry was prepared.

The positive electrode active material layer 23 of 30 μm was then formed by applying the positive electrode slurry to one surface of a SUS foil having a thickness of 20 microns (μm) as the current collector 22 and drying the positive electrode slurry.

The negative electrode active material layer 24 was prepared in the following manner. Specifically, a mixture of 90 wt % of hard carbon as a negative electrode active material and 10 wt % of PVDF as a binder is prepared. NMP as a slurry viscosity adjusting solvent was added to the mixture until a viscosity optimal for an application operation was reached, whereby a negative electrode slurry was prepared.

The negative electrode active material layer 24 of 30 μm was then formed by applying the negative electrode slurry to a surface of the current collector 22 opposite to the positive electrode active material layer 23 and drying the negative electrode slurry.

A structure of the bipolar electrode 21 was thus obtained by forming the positive electrode active material layer 23 and the negative electrode active material layer 24 on the opposite surfaces of the SUS foil as the current collector 22.

Referring to FIGS. 10A to 10C, the bipolar electrode 21 was cut into a piece of 160×130 millimeters (mm), and the surfaces of the SUS were exposed by peeling off an outer peripheral part having a width of 10 mm from each of the positive and negative electrodes. As a result, the bipolar electrode 21 was prepared which includes electrode surfaces of 140×110 mm and the current collector 22 formed of the SUS having a width of 10 mm exposed at the outer peripheral sides of the electrode surfaces.

Next, a formation process of the electrolyte layer 25 will be described.

A pre-gel electrolyte containing 90 wt % of an electrolytic solution containing 1 moll of lithium hexafluorophosphate (LiPF6) and having a boiling point of 242° C. and 10 wt % of PVdF-HFP containing 10 wt % of a hexafluoropropene (HFP) copolymer as a host polymer in a mixed solvent of propylene carbonate-ethylene carbonate (PC-EC) was prepared. By adding dimethyl carbonate (DMC) as a viscosity adjusting solvent to this pre-gel electrolyte until a viscosity optimal for an application operation was reached, an electrolytic solution was prepared. The electrolytic solution was applied to each electrode surface of the positive electrode active material layer 23 and the negative electrode active material layer 24 of the bipolar electrode 21 and DMC was dried.

Figure 12A:
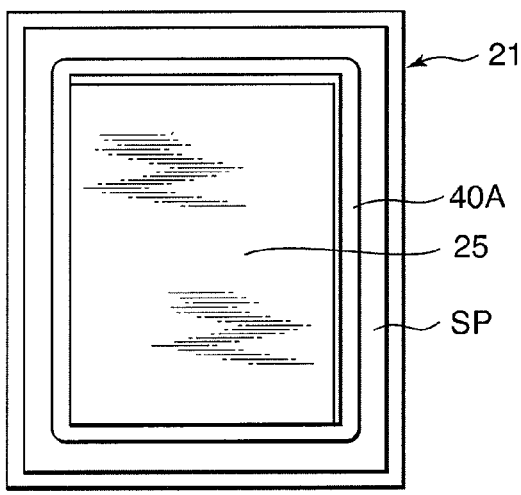
FIGS. 12A and 12B are a front view and a lateral sectional view of the bipolar electrode on which a separator is laminated.
Figure 12B:
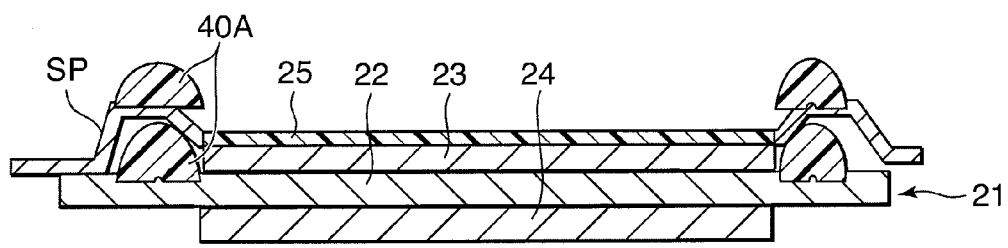

By alternately placing this bipolar electrode 21 and the separator SP as shown in FIGS. 12A and 12B, the electrolytic solution applied to each electrode surface of the positive electrode active material layer 23 and the negative electrode active material layer 24 was impregnated into the separator SP. In this way, the electrolyte layer 25 was formed in an area range of the separator SP corresponding to each electrode surface of the positive electrode active material layer 23 and the negative electrode active material layer 24.

Next, a formation process of a seal precursor will be described.

Figure 11A:
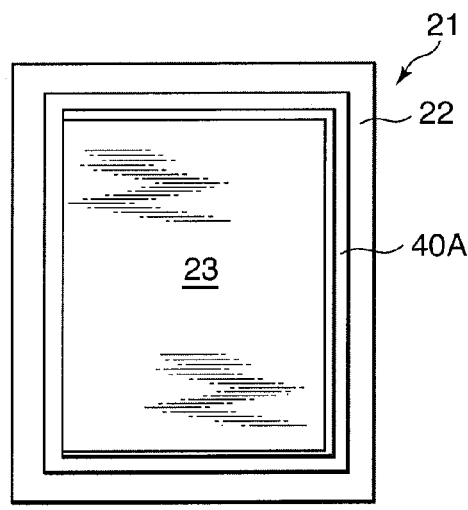
FIGS. 11A and 11B are a front view and a longitudinal sectional view of the bipolar electrode on which a seal precursor is arranged.
Figure 11B:
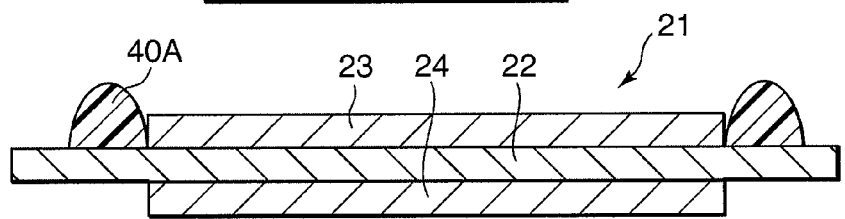

Referring to FIGS. 11A and 11B, a seal precursor 40A made of a one-part uncured epoxy resin was applied to the exposed part of the SUS foil outside the positive electrode of the bipolar electrode 21 using a dispenser.

Referring to FIGS. 12A and 12B, the separator SP of 170× 140 (mm) made of a polyethylene (PE) film having a thickness of 12 μm and a melting point of 134° C. was so arranged on the positive electrode side as to cover the entire surface of the current collector 22 including the SUS. In only Example #8 to be described later, a polyimide (PI) separator having a thickness of 15 μm and a melting point of 350° C. or higher was used. Thereafter, a seal precursor 40A made of the one-part uncured epoxy resin was applied to a position of the separator SP to be overlapped with the seal precursor 40A using the dispenser.

Herein, the separator SP projects outward through the seal precursor 40A over the entire circumference as shown. This projecting part touches neither the positive electrode active material layer 23 nor the negative electrode active material layer 24 and the electrolyte layer 25 is not formed in this part. The electrolyte layer 25 is formed only in an area enclosed by the seal precursors 40A.

By laminating 13 pairs of the bipolar electrode 21 and the separator SP described above, a structure of the laminated body 30 in which 12 cells 26 are laminated was prepared.

Next, the press molding of a bipolar battery will be described.

Figure 13:
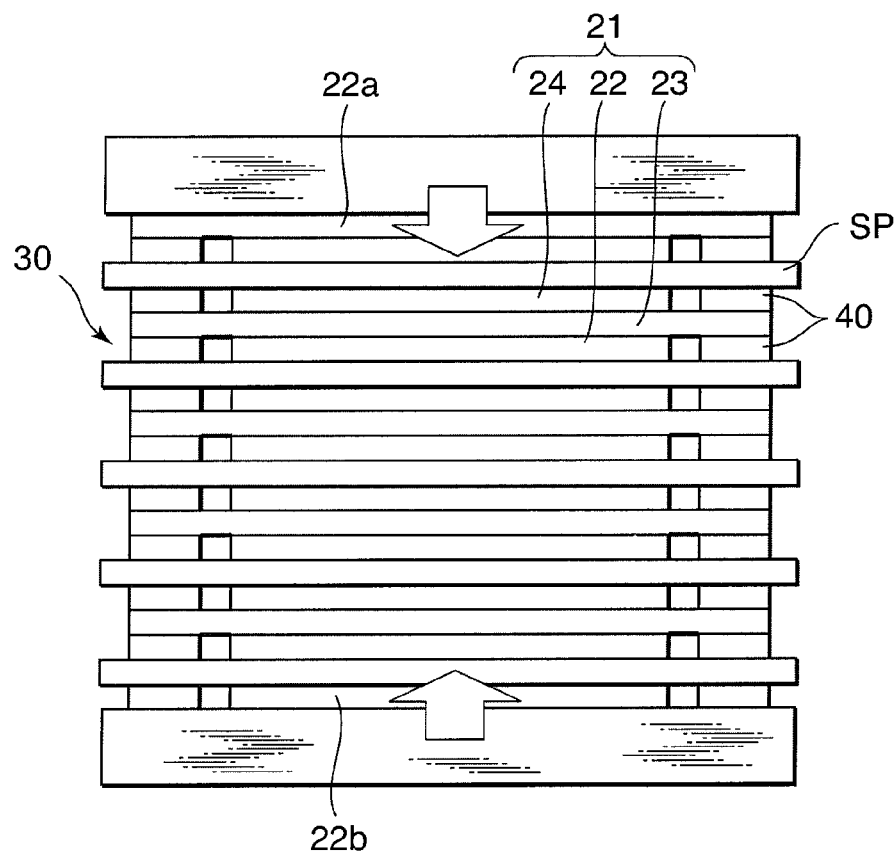
FIG. 13 is a schematic side view of a press machine showing a final formation process of a bipolar secondary battery.
Figure 14:
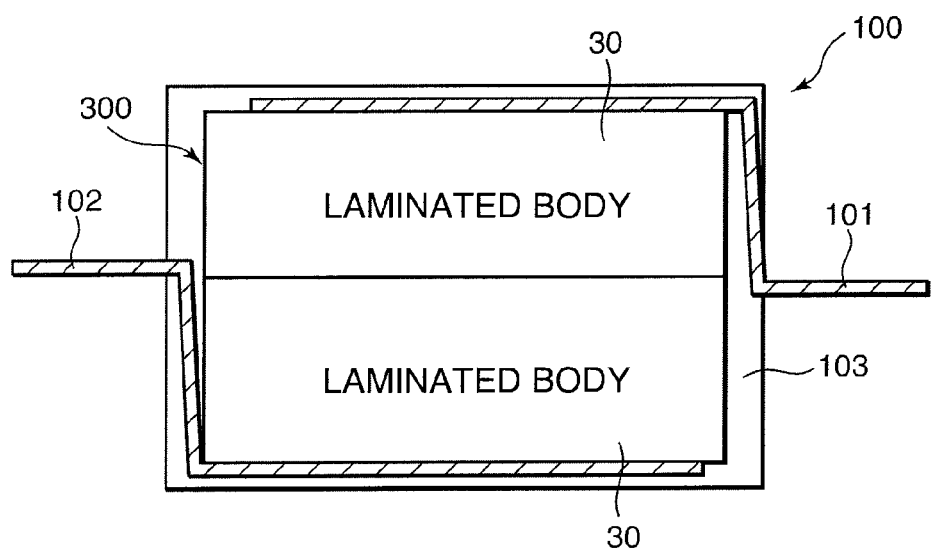
FIG. 14 is a schematic longitudinal sectional view of a bipolar secondary battery according to a Comparative Example #1 including no current control layer.

Referring to FIG. 13, the seal precursors 40A were cured to obtain seal portions 40 by thermally pressing the structures of the laminated bodies 30 configured as described above, with a surface pressure of 1 kilogram (kg)/square centimeter (cm$^2$) (≈kilopascal (kPa)) at 80° C. for 1 hour by a thermal press machine. By this process, the seal portions 40 can be pressed to a predetermined thickness and can be further cured, and the laminated body 30 in which 12 layers of cells 26 were laminated was completed.

Next, a fabrication process of the current control layer 50 will be described.

A PET plate having a thickness of 300 μm was cut into a piece of 170 mm×140 mm similarly to the separator SP. A cut of a size into which the temperature sensitive resistor 52 was fitted was provided at a position of the cut PET plate corresponding to the central part shown in FIG. 4. In only a PET plate for Example #13 to be described later, a cut of a size into which the temperature sensitive resistor 52 was fitted was provided at a position corresponding to a corner part of the current control layer 50 as shown in FIG. 7.

Pieces of different polymer PTC sheets, whose resistance starts suddenly increasing at 140° C., 120° C. and 110° C., cut out to have a predetermined area were used as the temperature sensitive resistor 52.

The current moderation layers 56 used in Example #10 to be described later were prepared by cutting an aluminum (Al) plate of 50 μm into a piece of 160×130 (mm). The prepared two current moderation layers 56 were arranged to sandwich the current control layer 50 from opposite sides.

Next, packaging will be described.

The battery main body 300 was obtained by gripping the current control layer 50 between two laminated bodies 30 or any two of laminated bodies 30 out of four laminated bodies 30 formed in the above process via conductive double-sided adhesive tapes. For Example #10, two current moderation layers 56 were fixed to the both surfaces of the current control layer 50 via conductive double-sided adhesive tapes and this was arranged between two laminated bodies 30 via conductive double-sided adhesive tapes to obtain the battery main body 300.

On the other hand, for Comparative Example #1, two laminated bodies 30 were directly bonded using a conductive double-sided adhesive tape to obtain the battery main body 300.

Further, the positive electrode current collecting plate 101 and the negative electrode current collecting plate 102 were bonded to both ends of the battery main body 300 using conductive double-sided adhesive tapes. A surface of the positive electrode current collecting plate 101 opposite to the battery main body 300 was bonded to the inner peripheral surface of the case member 103a using a double-sided adhesive tape. The flange portions of the case members 103a, 103b were welded to vacuum seal the case 103 with taken-out parts of the positive electrode current collecting plate 101 and the negative electrode current collecting plate 102 gripped between the flange portions.

By the above process, Examples #1 to #13 according to this invention relating to the bipolar secondary battery 100 and Comparative Example #1 not according to this invention were completed.

Specifications of Examples #1 to #13 and Comparative Example #1 are shown in TABLE-1.

electrode active material layer 24. A resistance value of the temperature sensitive resistor 52 of the bipolar secondary battery 100 in normal use was approximately 3/100 of the internal resistance of the laminated body 30.

In Example #7, the area of the temperature sensitive resistor 52 having a resistance increase starting temperature of 120° C. was set at 1/100 of the electrical reaction area of the positive electrode active material layer 23 and the negative electrode active material layer 24.

TABLE 1

| NAME | CURRENT CONTROL LAYER | NOS. OF LAMINATED BODIES | TEMPERATURE SENSITIVE RESISTOR AREA/ ELECTRICAL REACTION AREA | LAMINATED BODY RESISTANCE/ TEMPERATURE SENSITIVE RESISTOR RESISTANCE IN NORMAL STATE. | SEPARATOR MATERIAL | RESISTANCE INCREASE START TEMPERATURE OF TEMPERATURE SENSITIVE RESISTOR | BATTERY SHAPE |
|---|---|---|---|---|---|---|---|
| Comparative Example#1 | Absent | 2 | — | — | PE | — | FIG. 14 |
| Example#1 | Present | 2 | 2/3 | 1/100 or less | PE | 140° C. | FIG. 3 |
| Example#2 | Present | 2 | 1/2 | 1/100 or less | PE | 140° C. | FIG. 3 |
| Example#3 | Present | 2 | 1/5 | 1/100 or less | PE | 140° C. | FIG. 3 |
| Example#4 | Present | 2 | 1/50 | 1/100 or less | PE | 140° C. | FIG. 3 |
| Example#5 | Present | 2 | 1/100 | 1/100 or less | PE | 140° C. | FIG. 3 |
| Example#6 | Present | 2 | 1/500 | Approx. 3/100 | PE | 140° C. | FIG. 3 |
| Example#7 | Present | 2 | 1/100 | 1/100 or less | PE | 120° C. | FIG. 3 |
| Example#8 | Present | 2 | 1/100 | 1/100 or less | PI | 140° C. | FIG. 3 |
| Example#9 | Present | 2 | 1/100 | 1/100 or less | PE | 110° C. | FIG. 3 |
| Example#10 | Present | 2 | 1/100 | 1/100 or less | PE | 120° C. | FIG. 9 |
| Example#11 | Present | 4 | 1/100 | 1/100 or less | PE | 120° C. | FIG. 5 |
| Example#12 | Present | 4 | 1/100 | 1/100 or less | PE | 120° C. | FIG. 6 |
| Example#13 | Present | 4 | 1/100 | 1/100 or less | PE | 120° C. | FIG. 8 |

In Examples #1 to #10, the battery main body 300 was composed of two laminated bodies 30, the current control layer 50 was arranged between the two laminated bodies 30 and the temperature sensitive resistor 52 was arranged in the central part of the current control layer 50.

In Example #1, the area of the temperature sensitive resistor 52 having a resistance increase starting temperature of 140° C. was set at 2/3 of the electrical reaction area of the positive electrode active material layer 23 and the negative electrode active material layer 24.

In Example #2, the area of the temperature sensitive resistor 52 having a resistance increase starting temperature of 140° C. was set at 1/2 of the electrical reaction area of the positive electrode active material layer 23 and the negative electrode active material layer 24.

In Example #3, the area of the temperature sensitive resistor 52 having a resistance increase starting temperature of 140° C. was set at 1/5 of the electrical reaction area of the positive electrode active material layer 23 and the negative electrode active material layer 24.

In Example #4, the area of the temperature sensitive resistor 52 having a resistance increase starting temperature of 140° C. was set at 1/50 of the electrical reaction area of the positive electrode active material layer 23 and the negative electrode active material layer 24.

In Example #5, the area of the temperature sensitive resistor 52 having a resistance increase starting temperature of 140° C. was set at 1/100 of the electrical reaction area of the positive electrode active material layer 23 and the negative electrode active material layer 24.

In Example #6, the area of the temperature sensitive resistor 52 having a resistance increase starting temperature of 140° C. was set at 1/500 of the electrical reaction area of the positive electrode active material layer 23 and the negative In Example #8, the area of the temperature sensitive resistor 52 having a resistance increase starting temperature of 140° C. was set at 1/100 of the electrical reaction area of the positive electrode active material layer 23 and the negative electrode active material layer 24 of the laminated body 30 as in Example #5. Further, a polyimide (PI) separator having a thickness of 15 μm and a melting point of 350° C. or higher as described above was used as the separator SP. The separator SP in other Examples and Comparative Example #1 was made of polyethylene (PE) having a melting point of 134° C.

In Example #9, the temperature sensitive resistor 52 having a resistance increase starting temperature of 110° C. was used and the area thereof was set at 1/100 of the electrical reaction area of the positive electrode active material layer 23 and the negative electrode active material layer 24.

In Example #10, the current moderation layers 56 formed in the process described above were arranged between the current control layer 50 and the laminated bodies 30 on the opposite sides thereof as shown in FIG. 9.

In Examples #11 to #13, the battery main body 300 was composed of four laminated bodies 30.

In Example #11, the area of the temperature sensitive resistor 52 having a resistance increase starting temperature of 120° C. was set at 1/100 of the electrical reaction area of the positive electrode active material layer 23 and the negative electrode active material layer 24. Further, as shown in FIG. 5, the current control layer 50 was arranged between the second and third laminated bodies 30 from one end of the battery main body 300, i.e. in a middle part of the battery main body 300 with respect to the lamination direction of the laminated bodies 30.

In Example #12, the temperature sensitive resistor 52 having a resistance increase starting temperature of 120° C. was used and the area thereof was set at 1/100 of the electrical reaction area of the positive electrode active material layer 23 and the negative electrode active material layer 24. Further, as shown in FIG. 6, the current control layer 50 was arranged between the first and second laminated bodies 30 from one end of the battery main body 300 with respect to the lamination direction of the laminated bodies 30, i.e. at a position deviated from the middle part of the battery main body 300.

In Example #13, the temperature sensitive resistor 52 having a resistance increase starting temperature of 120° was used and the area thereof was set at 1/100 of the electrical reaction area of the positive electrode active material layer 23 and the negative electrode active material layer 24. Further, the current control layer 50 was arranged between the second and third laminated bodies 30 from one end of the battery main body 300 with respect to the lamination direction of the laminated bodies 30, i.e. in the middle part of the battery main body 300. As shown in FIGS. 7 and 8, the temperature sensitive resistor 52 was arranged in a corner part of the current control layer 50.

It should be noted that the boiling point of the electrolytic solution was 140° C. in all of Comparative Example #1 and Examples #1 to #13.

A short-circuit test of an external electrical circuit connected to the bipolar secondary batteries 100 of Comparative Example #1 and Examples #1 to #13 was conducted to measure a reached maximum temperature and a maximum temperature arrival time of the battery main body 300 and battery states after the test were confirmed. Test results are shown in TABLE-2A and TABLE-2B.

and an output of the laminated body 30 in a normal operation is affected. Thus, the resistance of the current control layer 50 to the internal resistance of the laminated body 30 is preferably set at 1/100 or more.

In any of Examples #1 to #6, the resistance increase starting temperature of the temperature sensitive resistor 52 is 140° C., which is equal to the boiling point of 140° C. of the electrolytic solution and above the melting point of 134° C. of the separator SP. Thus, a current suppression effect can be obtained, but the reached maximum temperature is 215° C. to 250° C. which exceed the melting point of the separator SP and the boiling point of the electrolytic solution. Thus, the melting of the separator SP and the boiling of the electrolytic solution cannot be completely prevented. As a result, the battery main body 300 undergoes a certain expansion deformation.

On the other hand, in Example #7, the resistance increase starting temperature of 120° C. of the temperature sensitive resistor 52 satisfies the condition of being not higher than the lower one of the boiling point of 140° C. of the electrolytic solution and the melting point of 134° C. of the separator SP. Similarly, in Example #8, the resistance increase starting temperature of 140° C. of the temperature sensitive resistor 52 also satisfies the condition of being not higher than the lower one of the boiling point of 140° C. of the electrolytic solution and the melting point of 350° C. of the separator SP. In Examples #7 and #8, the reached maximum temperature could be suppressed to or below the boiling point of 140° C.

TABLE 2A

| ITEM | Comparative Example#1 | Example#1 | Example#2 | Example#3 | Example#4 | Example#5 | Example#6 |
|---|---|---|---|---|---|---|---|
| Max. Temp. | 300° C. | 250° C. | 220° C. | 215° C. | 210° C. | 200° C. | 200° C. |
| Max. Arrival Time | 0.5 min. | 3 min. | 15 min. | 18 min. | 20 min. | 30 min. | 60 min. |
| Final State | Battery Swelling (Large) | Battery Swelling (Large) | Battery Swelling (Medium) | Battery Swelling (Medium) | Battery Swelling (Small) | Battery Swelling (Small) | Battery Swelling (Small) |

TABLE 2B

| ITEM | Example#7 | Example#8 | Example#9 | Example#10 | Example#11 | Example#12 | Example#13 |
|---|---|---|---|---|---|---|---|
| Max. Temp. | 130° C. | 140° C. | 115° C. | 120° C. | 120° C. | 120° C. | 120° C. |
| Max. Arrival Time | 30 min. | 30 min. | 60 min. | 90 min. | 30 min. | 20 min. | 20 min. |
| Final State | No Change | No Change | No Change | No Change | No Change | No Change | No Change |

Comparison of Examples #1 to #6 reveals that the reached maximum temperature of the battery main body 300 decreases and the maximum temperature arrival time becomes longer as the area of the temperature sensitive resistor 52 is reduced. Particularly, if the ratio of the area of the temperature sensitive resistor 52 to the electrical reaction area of the positive electrode active material layer 23 and the negative electrode active material layer 24 is set at ½ or less, the reached maximum temperature of the battery main body 300 is further reduced and the maximum temperature arrival time is drastically extended.

However, if the area ratio of the temperature sensitive resistor 52 is made excessively small as in Example #6, a ratio of the resistance of the current control layer 50 to the internal resistance of the laminated body 30 becomes as high as 3/100 of the electrolytic solution and the deformation of the battery main body 300 could be prevented.

In Example #9, since the resistance increase starting temperature of the temperature sensitive resistor 52 was even lower, the reached maximum temperature was only 115° C. that was lower than both the boiling point of 140° C. of the electrolytic solution and the melting point of 120° C. of the separator SP and the boiling of the electrolytic solution and the melting of the separator SP could be more reliably prevented.

In Example #10, since the current moderation layers 56 were arranged on the opposite sides of the current control layer 50 in addition to the configuration of Example #7, the current is concentrated on the temperature sensitive resistor 52 to an increased degree and the reached maximum temperature could be lower than in Example #7 and the maximum temperature arrival time could be extended more than in Example #7. The current moderation layers 56 are thought to have a large effect as the resistance of the bipolar electrode 21 composed of the current corrector 22, the positive electrode active material layer 23 and the negative electrode active material layer 24 increases.

It was found from comparison of Examples #11 and #12 that the time to reach the maximum temperature was more extended when the current control layer 50 was arranged near the middle point of the battery main body 300 with respect to the lamination direction of the laminated bodies 30 than when it was arranged at another position. This is thought to be because the transfer of heat generated in the battery main body 300 to the current control layer 50 is faster at a position near the middle point of the battery main body 300 than at a position distant from the middle point.

It was found from comparison of Examples #11 and #13 that the time to reach the maximum temperature was more extended when the temperature sensitive resistor 52 was arranged in the central part of the current control layer 50 than when it was arranged in the corner part. This is thought to be because the transfer of heat generated in the battery, main body 300 to the current control layer 50 is faster in the central part of the current control layer 50 than in the corner part.

The contents of Tokugan 2010-115123, with a filing date of May 19, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, this invention is applicable not only to lithium-ion batteries, but also to any bipolar secondary battery.

INDUSTRIAL FIELD OF APPLICATION

As described above, the flow of a large amount of current into a bipolar secondary battery can be interrupted according to this invention. This produces a preferable effect in protecting a secondary battery of an electric vehicle.

The embodiments of this invention in which an exclusive property or privilege is claimed are defined as follows:

The invention claimed is:

1. A bipolar secondary battery, comprising:
a plurality of laminated bodies connected in series, each laminated body comprising a plurality of bipolar electrodes laminated via an electrolyte layer and each bipolar electrode comprising:
  a plate-shaped current collector;
  a positive electrode active material layer arranged on one surface of the current collector; and
  a negative electrode active material layer arranged on another surface of the current collector;
a positive electrode formed on one end of the plurality of laminated bipolar electrodes in a lamination direction;
a negative electrode formed on another end of the plurality of laminated bipolar electrodes in the lamination direction;
a temperature sensitive resistor arranged between the positive electrode and the negative electrode of a pair of adjacent laminated bodies, the temperature sensitive resistor increasing resistance in response to a temperature increase and having a smaller area than an electrical reaction area of the positive electrode active material layer and the negative electrode active material layer; and
a current interrupting portion provided on the same plane as the temperature sensitive resistor so as to form a current control layer arranged between the positive electrode and the negative electrode of the pair of the adjacent laminated bodies,
wherein the current interrupting portion has a higher electrical resistance than the temperature sensitive resistor.

2. The bipolar secondary battery as defined in claim 1, wherein the electrolyte layer is formed of a separator infiltrated with an electrolytic solution.

3. The bipolar secondary battery as defined in claim 2, wherein a resistance increase starting temperature at which the temperature sensitive resistor starts increasing electrical resistance is lower than the lower one of a boiling point of the electrolytic solution and a melting point of the separator.

4. The bipolar secondary battery as defined in claim 2, further comprising a current moderation layer arranged between each of the pair of adjacent laminated bodies and the temperature sensitive resistor,
wherein the current moderation layer has a lower electrical resistance than any one of the current collector, the positive electrode active material layer and the negative electrode active material layer.

5. The bipolar secondary battery as defined in claim 1, wherein a resistance increase starting temperature at which the temperature sensitive resistor starts increasing the electrical resistance is within a range of 120 to 140 degrees Celsius.

6. The bipolar secondary battery as defined in claim 1, wherein a resistance value of the temperature sensitive resistor in a normal charge/discharge operation of the bipolar secondary battery is within a range of ½ to ¹⁄₁₀₀ of an electrical resistance of one of the laminated bodies.

7. The bipolar secondary battery as defined in claim 1, wherein the temperature sensitive resistor is formed of a positive temperature coefficient thermistor whose electrical resistance reversibly changes with temperature.

8. The bipolar secondary battery as defined in claim 1, wherein the bipolar secondary battery comprises three or more laminated bodies connected in series.

9. The bipolar secondary battery as defined in claim 1, wherein the temperature sensitive resistor is in contact with a central art of the current collector.

10. The bipolar secondary battery as defined in claim 1, wherein the bipolar secondary battery comprises an even number of laminated bodies connected in series, and the temperature sensitive resistor is arranged at a middle position of the even number of laminated bodies connected in series with respect to a connecting direction of the laminated bodies.

11. A bipolar secondary battery, comprising:
a plurality of laminated bodies connected in series, each laminated body comprising a plurality of bipolar electrodes laminated via an electrolyte layer and each bipolar electrode comprising:
  a plate-shaped current collector;
  a positive electrode active material layer arranged on one surface of the current collector; and
  a negative electrode active material layer arranged on another surface of the current collector;
a positive electrode formed on one end of the plurality of laminated bipolar electrodes in a lamination direction;
a negative electrode formed on another end of the plurality of laminated bipolar electrodes in the lamination direction;

a temperature sensitive resistor arranged between the positive electrode and the negative electrode of a pair of adjacent laminated bodies, the temperature sensitive resistor increasing resistance in response to a temperature increase and having a smaller area than an electrical reaction area of the positive electrode active material layer and the negative electrode active material layer, wherein the electrolyte layer is formed of a separator infiltrated with an electrolytic solution; and a current moderation layer arranged between each of the pair of adjacent laminated bodies and the temperature sensitive resistor, wherein the current moderation layer has a lower electrical resistance than any one of the current collector, the positive electrode active material layer and the negative electrode active material layer.

\* \* \* \* \*